United States Patent [19]

DeVoursney et al.

[11] Patent Number: 5,605,239
[45] Date of Patent: Feb. 25, 1997

[54] DUNNAGE RACK BAR

[75] Inventors: Thomas F. DeVoursney, Muskegon; Peter Sturrus, Grand Haven, both of Mich.

[73] Assignee: Shape Corp., Grand Haven, Mich.

[21] Appl. No.: 433,601

[22] Filed: May 3, 1995

[51] Int. Cl.$^6$ ................................................ A47F 5/00
[52] U.S. Cl. .................... 211/183; 211/182; 410/143; 410/151; 428/595; 428/602
[58] Field of Search .................................. 211/162, 182, 211/183; 410/143, 151, 152; 428/586, 595, 600, 602

[56] References Cited

U.S. PATENT DOCUMENTS

| | | | |
|---|---|---|---|
| 4,238,550 | 12/1980 | Burgess et al. | 211/162 X |
| 4,553,888 | 11/1985 | Crissy et al. | 410/152 X |
| 5,037,256 | 8/1991 | Schroeder | 410/143 |
| 5,326,204 | 7/1994 | Carlson et al. | 211/183 X |
| 5,520,316 | 5/1996 | Chen | 211/182 X |

Primary Examiner—Robert W. Gibson, Jr.
Attorney, Agent, or Firm—Warner Norcross & Judd

[57] ABSTRACT

A one-piece dunnage bar for a dunnage rack of the type used to store and transport parts within an automotive factory. The dunnage bar includes integral inner and outer C-shaped portions roll-formed from a single piece of structural metal. The inner and outer portions each include overlying wall segments that cooperate to define the mouth of the C shape. The thickness of each of these wall segments is one-half of the thickness of the remainder of the walls so that the pancaked wall segments have a combined thickness approximately the same as that of the remaining walls.

8 Claims, 2 Drawing Sheets

DUNNAGE RACK BAR

BACKGROUND OF THE INVENTION

The present invention relates to dunnage racks used to store and transport parts, such as automotive parts, and more particularly to a bar used in such racks.

Dunnage racks are widely used in manufacturing to store and transport parts, for example, automotive parts. These racks include a frame and a plurality of horizontal bars supported on the frame. Modular connectors permit the bars to be spaced and positioned in a wide variety of configurations to accommodate different parts to be stored in the rack. A plastic and/or foam insert, generally well known to those having skill in the art, typically is mounted within each bar to engagingly support the parts.

Known dunnage bars are basically of two constructions. A first is extruded of aluminum and includes a T-shaped slot within which the insert is retained. These aluminum bars are relatively expensive. Further, the bars are subject to considerable pilferage because of their value as scrap aluminum.

A second is fabricated of two roll-formed steel pieces as illustrated in FIG. 5. The outer piece 110 is generally C-shaped including three closed planar sides 111, 112, and 113 and a fourth side 114 defining a mouth 115. The inner piece 120 is generally trough-shaped and located just behind the mouth 115. The two pieces are nested and then spot-welded together at spaced locations 130 to intersecure the pieces. While this steel bar is less expensive than the extruded aluminum bar, it requires welds to be placed along both longitudinal sides of the dunnage bar. Additionally, the inner and outer pieces can break-apart from each other as a result of faulty welds or heavy loads.

SUMMARY OF THE INVENTION

The aforementioned problems are overcome by the present invention wherein a dunnage bar is roll formed from a single piece of metal. The unique profile includes an outer C-shaped portion surrounding an inner C-shaped portion. The two portions are integrally connected at their mouths where the metal is folded against itself.

Preferably in the mouth area, where the metal is folded against itself, the thickness of the metal is reduced. Most preferably, the metal thickness is reduced by half so that the thickness of the folded metal in the mouth area is approximately the same thickness as the metal in the remainder of the bar. The defined thickness reduction enables the bar to receive conventional inserts.

The present invention provides a simple and inexpensive dunnage bar that does not require nesting or welding of separate inner and outer pieces. Additionally, the present invention accommodates standard inserts dimensioned for single-wall thickness.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
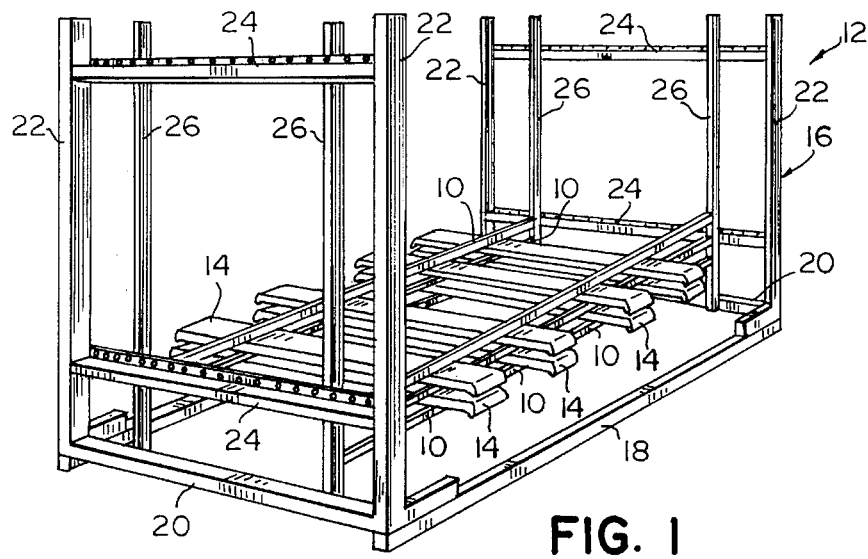
FIG. 1 is a perspective view of a dunnage rack incorporating the dunnage bar of the present invention.
Figure 2:
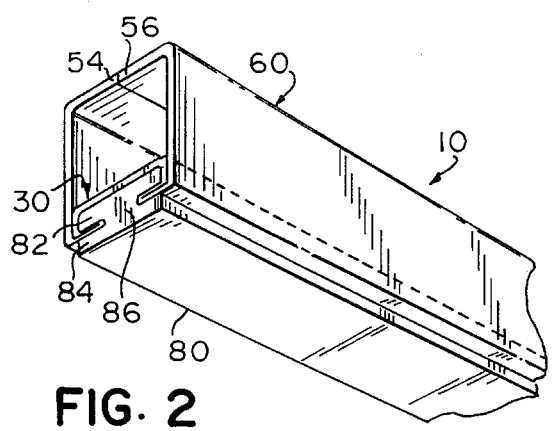
FIG. 2 is a perspective view of a section of the dunnage bar with an insert in place.
Figure 3A:
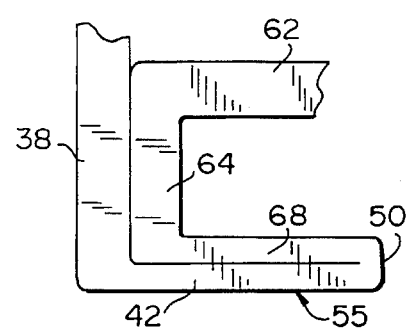
FIG. 3A is an enlarged view of the area with line III in FIG. 3.
Figure 3:
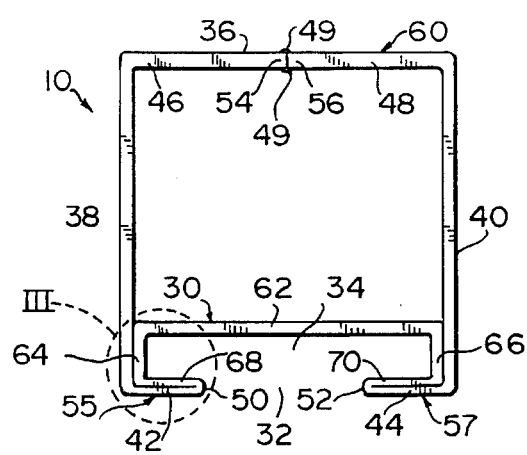
FIG. 3 is an end elevation view of the dunnage bar with the insert removed.
Figure 5:
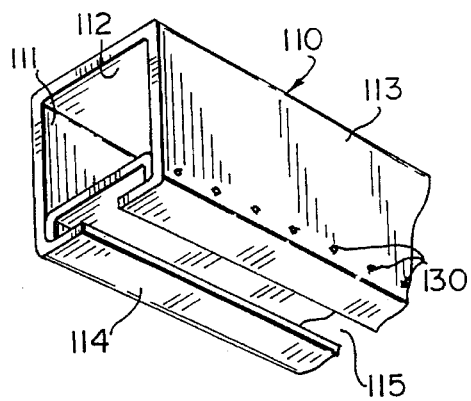
FIG. 5 is a perspective view of a section of a prior art dunnage bar.

The dunnage bar of the present invention is illustrated in FIGS. 1–3 and generally designated 10. As illustrated in FIG. 1, a plurality of the dunnage bars 10 are mounted within and become a portion of a dunnage rack 12.

I. Dunnage Rack

With the exception of the dunnage bars 10, the dunnage rack 12 is generally known to those skilled in the art. For example, such dunnage racks are widely used in the automotive industry to store and transport parts, components, subassemblies, stampings, and the like within and between manufacturing facilities. As illustrated in FIG. 1, the dunnage rack 12 holds automobile bumpers 14.

The dunnage rack 12 includes a frame 16 including horizontal base members 18 and end frames 20. The end frame sections 20 in turn include a plurality of vertical uprights 22, horizontal supports 24, and vertical supports 26. As is known, the horizontal supports 24 and the vertical supports 26 can be interconnected in a variety of configurations on the vertical uprights 22. Also as is well-known, the dunnage bars 10 are mounted on the horizontal and/or vertical members 24 and 26 using conventional attachment hardware (not shown).

II. Dunnage Bar Inserts

The inserts 80 are generally well known and therefore will be only briefly described. As best illustrated in FIG. 2, the insert is H-shaped including an inner retainer portion 82 located within the bar 10, an outer cushion portion 84 located outside the bar 10, and an interconnecting portion 86 located within the mouth 32. The inserts 80 are slid into the bars 10 to provide one cushioned side to the bar to engage the parts to be supported.

Figure 4:
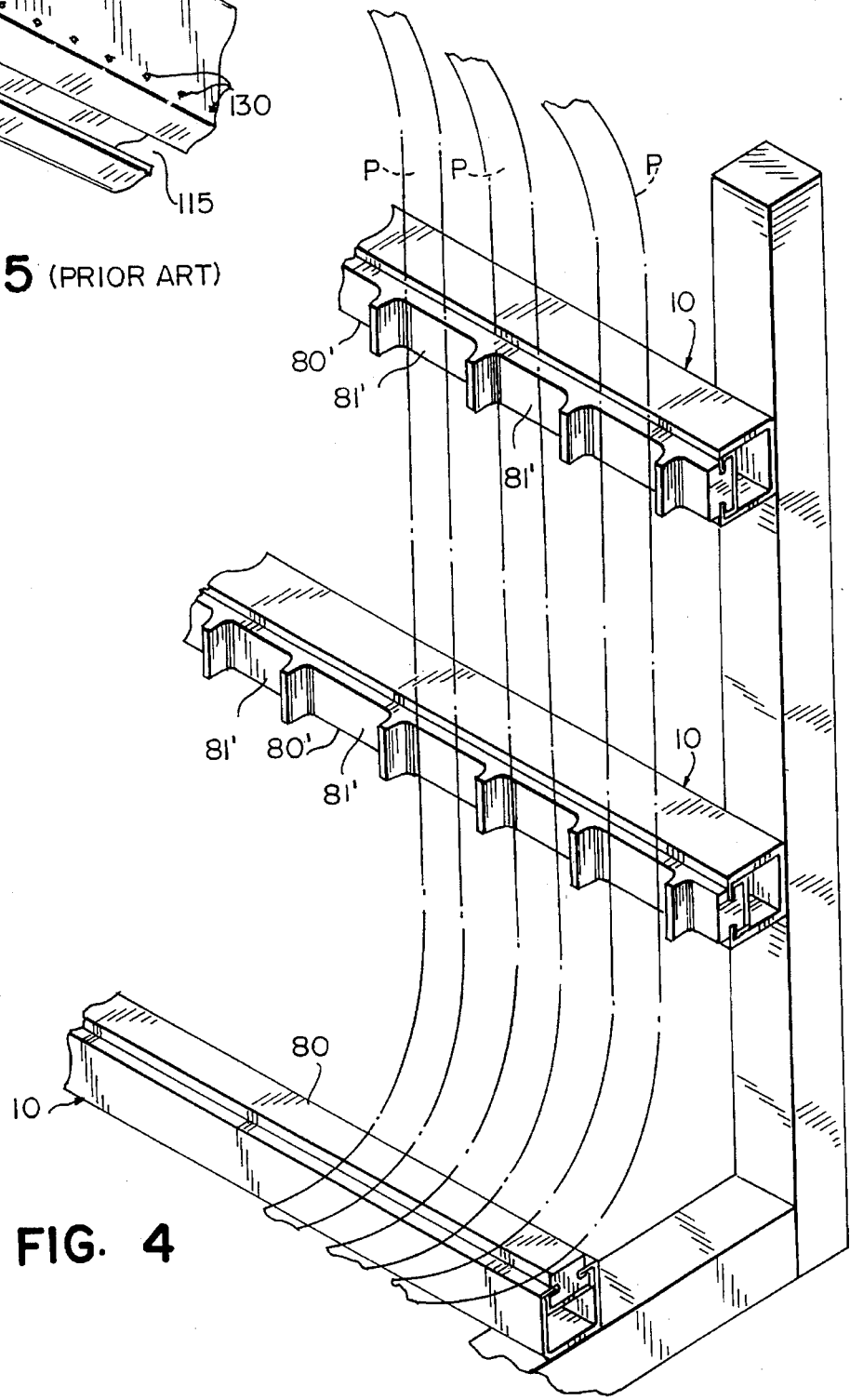
FIG. 4 is a perspective view of a dunnage rack wherein the dunnage bars include different inserts than shown in FIGS. 1 and 2 to support different parts.

An alternative insert 80' is illustrated in FIG. 4 wherein the dunnage rack is configured to support parts P in closely spaced relationship. The alternative insert 80' is generally well known and includes a plurality of scallops or cups 81' along its length. One of the parts P fits into each of the scallops or cups. Consequently, the parts P are spaced from one another.

III. Dunnage Bar

The dunnage bar 10, illustrated in greater detail in FIGS. 2 and 3, is fabricated of a single piece of steel and generally includes integral inner and outer C-shaped portions 60 and 30. The inner and outer portions 30 and 60, respectively, define a mouth 32 through which plastic and/or foam inserts 80 extend to support parts within the rack. The inner portion 30 defines a slot 34 located just behind the mouth 32 within which the inserts 80 fit.

The outer portion 60 is generally C-shaped and includes three generally flat closed sides 36, 38, and 40 and an open side defined by segments 42 and 44. The sides together define a square cross section to the bar 10.

Side 36 actually includes two side segments 46 and 48, which are the opposite lateral portions of the piece of the steel. The side segments 46 and 48 are welded together at 49. The weld can be continuous or discontinuous. Alternatively, the welding can be omitted in certain applications.

The wall segments 42 and 44 extend inwardly toward one another from the sides 38 and 40, respectively. The segments 42 and 44 are spaced from one another to define the mouth 32 through which, as mentioned above, the inserts 80 extend.

The sides 36, 38, and 40 are all generally of the same thickness. The wall segments 42 and 44 have a thickness generally one-half that of the other sides.

The inner portion 30 is also generally C-shaped and includes three generally flat closed sides 62, 64, and 66 and an open side defined by wall segments 68 and 70. The sides together define a rectangular cross section for the inner portion 30. The rectangle has a length just fitting within the outer portion 60 and a height substantially less than the height of the outer portion 60.

As with the outer portion 60, the wall segments 68 and 70 extend inwardly toward one another from the sides 64 and 66, respectively. These segments 68 and 70 are integrally connected with wall segments 42 and 44, respectively, along a fold line or edge 50 and 52, respectively, to form a pair of stub walls 55 and 57. Sides 64 and 66 space side 62 from wall segments 68 and 70 to define slot 34 therebetween.

The sides 62, 64, and 66 are all generally of the same thickness. The wall segments 68 and 70 have a thickness generally one-half that of the other sides.

The outer and inner wall segments 42 and 68 overlying engage one another, and similarly the outer and inner wall segments 44 and 70 overlying engage one another. The double layer thickness of the stub walls 55 and 57 is approximately the same as the single layer thickness of outer sides 36, 38, and 40 and inner sides 62, 64, and 66.

The dunnage bar 10 is roll-formed of structural metal—preferably 12-gauge, cold-rolled steel. Different materials having different gauges can be substituted depending upon the application. For example, other suitable materials include hot-rolled steel and high-strength steel.

IV. Manufacture and Use

As noted above, the outer and inner bar portions 30 and 60 are roll-formed of a single piece of structural metal, preferably steel. The preferred input stock to the rolling operation is 12-gauge hot-rolled steel. The steel is roll-formed using techniques well known to those skilled in the art, wherein the steel passes sequentially through a series of rolling stations. During the rolling operation, the portions of the input stock forming wall segments 42, 44, 68, and 70 are flattened or compressed to one-half of the stock wall thickness.

The free ends 54 and 56 of the side segments 46 and 48 are welded together using conventional techniques and apparatus. The appropriate insert is slid into the bar 10 by feeding base portion 82 into slot 34.

The bar 10 of the present invention is used in the identical fashion as the prior art bars. The bars 10 are mounted between the opposite side frames 20 of the rack using conventional hanger hardware (not illustrated). Parts are supported by the inserts 80. Parts are secured in, and removed from, the dunnage rack in a fashion generally known to those skilled in the art.

The above description is that of a preferred embodiment of the invention. Various alternations and changes can be made without departing from the spirit and of broader aspects of the invention as defined in the appended claims, which are to be interpreted in accordance with the principles of patent law including the doctrine of equivalents.

The embodiments of the invention in which an exclusive property or privilege is claimed are defined as follows:

1. A one-piece dunnage rack bar comprising:

a generally C-shaped outer portion; and a generally C-shaped inner portion integral with and substantially surrounded by said outer portion, said inner portion and said outer portion together defining a mouth;

said inner portion including a pair of inner wall segments defining said mouth;

said outer portion including a pair of outer wall segments defining said mouth, each of said outer wall segments integrally connected to one of said inner wall segments along a fold line, each of said outer wall segments overlying engaging one of said inner wall segments; and each of said inner and outer portions having a generally uniform wall thickness except at said inner and outer wall segments, each of said inner and outer wall segments having a reduced wall thickness substantially less than the uniform wall thickness.

2. The dunnage bar of claim 1 wherein said reduced wall thickness is approximately one-half of said uniform wall thickness.

3. A one-piece bar for a dunnage rack of the type used in an automotive factory, said bar comprising:

an outer portion having a generally C-shaped cross section to define an outer mouth extending along the length of said outer portion; and an inner portion integral with said outer portion, said inner portion having a generally C-shaped cross section to define an inner mouth extending along the length of said inner portion, said inner mouth being coextensive with said outer mouth;

said inner and outer portions having a standard wall thickness;

said inner portion including a pair of spaced-apart inner wall segments defining said inner mouth and each having a reduced thickness substantially less than said standard wall thickness; and said outer portion including a pair of spaced-apart outer wall segments defining said outer mouth and each having a reduced thickness substantially less than said standard wall thickness.

4. The dunnage bar of claim 3 where said reduced thickness is approximately one-half of said standard wall thickness.

5. A one-piece dunnage bar for a dunnage rack, comprising:

an outer portion generally rectangular in cross section and including three generally closed sides and a fourth side defining a mouth; and an inner portion integral with and substantially enclosed by said outer portion, said inner portion being generally rectangular in cross section and including three generally rectangular sides and a fourth side defining a mouth, said mouth of said inner portion being substantially coextensive with said mouth of said outer portion;

said outer and inner portions having a standard wall thickness;

said mouth of said inner portion being defined by a pair of spaced-apart wall segments each having a thickness substantially one half of said standard wall thickness; and said mouth of said outer portion being defined by a pair of spaced-apart wall segments each having a thickness substantially one half of said standard wall thickness.

6. The dunnage bar of claim 5 wherein said wall segments of said outer portion are connected to said wall segments of said inner portion.

7. The dunnage bar of claim 5 wherein said wall segments of said outer portion are connected to said wall segments of said inner portion along a fold.

8. The dunnage bar of claim 7, wherein said inner portion and said outer portion are roll-formed from a single piece of structural metal.

* * * * *